US009144188B2

(12) United States Patent
Bover Trobat

(10) Patent No.: US 9,144,188 B2
(45) Date of Patent: Sep. 29, 2015

(54) AUTONOMOUS SELF-ACTUATED TILLAGE IMPLEMENT

(76) Inventor: Damian Bover Trobat, Islas Baleares (ES)

( * ) Notice: Subject to any disclaimer, the term of this patent is extended or adjusted under 35 U.S.C. 154(b) by 76 days.

(21) Appl. No.: 13/810,158

(22) PCT Filed: Jul. 19, 2011

(86) PCT No.: PCT/ES2011/000232
§ 371 (c)(1),
(2), (4) Date: Jan. 14, 2013

(87) PCT Pub. No.: WO2012/010722
PCT Pub. Date: Jan. 26, 2012

(65) Prior Publication Data
US 2013/0112441 A1 May 9, 2013

(30) Foreign Application Priority Data
Jul. 22, 2010 (ES) .................................. 201031132

(51) Int. Cl.
A01B 3/50 (2006.01)
A01B 69/04 (2006.01)
(Continued)

(52) U.S. Cl.
CPC ................ A01B 69/008 (2013.01); A01B 3/50 (2013.01); B60L 8/003 (2013.01); H02J 7/35 (2013.01); Y02T 10/7083 (2013.01)

(58) Field of Classification Search
CPC ........ A01B 3/50; A01B 67/00; A01B 69/004; A01B 69/008
USPC .......................................................... 172/2, 3
See application file for complete search history.

(56) References Cited

U.S. PATENT DOCUMENTS 6,199,000 B1   3/2001   Keller et al.
7,878,429 B2 *  2/2011   Parod et al. .................... 239/735
(Continued)

FOREIGN PATENT DOCUMENTS

DE       889 522         9/1953
DE       100 15 016 A1   10/2001
(Continued)

OTHER PUBLICATIONS

ASABE, "Terminology and Definitions for Agricultural Tillage Implements," American Society of Agricultural and Biological Engineers, ASAE S414.2 Mar. 2009.
(Continued)

*Primary Examiner* — Thomas B Will
*Assistant Examiner* — Joel F. Mitchell
(74) *Attorney, Agent, or Firm* — Notaro, Michalos & Zaccaria P.C.

(57) ABSTRACT

An implement has at least a first plow share in front, provided with an anti-rollback mechanism, and at least a second plow share in the rear, with another anti-rollback mechanism. The plow shares are interconnected by alternate approaching and distancing mechanisms. A telematic control unit based on a computer system that is assisted by a global positioning system, autonomously guides movement of the implement. A steering system formed by an oscillating support can rotate in a plane perpendicular to the advancement direction of the implement and lifts one of the plow shares in relation to the ground and moves it laterally. A power supply system using renewable energy or internal or external combustion engines is mounted on the implement.

20 Claims, 4 Drawing Sheets

(51) Int. Cl.
*B60L 8/00* (2006.01)
*H02J 7/35* (2006.01)

(56) References Cited

U.S. PATENT DOCUMENTS

| | | | |
|---|---|---|---|
| 8,360,685 B1* | 1/2013 | Whiteside et al. | 405/160 |
| 2009/0084615 A1 | 4/2009 | Parod et al. | |
| 2013/0264080 A1* | 10/2013 | Keigley | 172/431 |
| 2015/0105963 A1* | 4/2015 | Blackwell et al. | 701/23 |

FOREIGN PATENT DOCUMENTS

| | | |
|---|---|---|
| GB | 1174622 | 12/1969 |
| GB | 2053637 | 2/1981 |

OTHER PUBLICATIONS

ASABE, "Agricultural Machinery Management Data," American Society of Agricultural and Biological Engineers, ASAE D497.5 FED2006.

F. M. Zoz and R. D. Grisso, "Traction and Tractor Performance," American Society of Agricultural and Biological Engineers, 913C0403, Feb. 2003.

D. R. P. Hettiaratchi and A. R. Reece, "Symmetrical three-dimensional soil failure," J. Terramechanics, vol. 4, No. 3, pp. 45-67, Jan. 1967.

E. McKyes and O. S. Ali, "The cutting of soil by narrow blades," J. Terramechanics, vol. 14, No. 2, pp. 43-58, Jun. 1977.

R. D. Grisso and J. V. Perumpral, "Review of models for predicting performance of narrow tillage tool," Trans. ASAE, vol. 28, No. 4, pp. 1062-1067, 1985.

E. K. S. Nambiar and R. Sands, "Effects of compaction and simulated root channels in the subsoil on root development, water uptake and growth of radiata pine," Tree Physiol., 1992.

R. D. Grisso, J. V. Perumpral, D. H. Vaughan, G. T. Roberson, and R. Pitman, "Predicting Tractor Diesel Fuel Consumption," Virginia Polytechnic Institute and State University, 2010.

W. Söhne, "Fundamentals of pressure distribution and soil compaction under tractor tires," Agric. Engin., vol. 39, p. 290, 1958.

W. R. Whalley, E. Dumitru, and A. R. Dexter, "Biological effects of soil compaction," Soil Tillage Res., vol. 35, No. 1, pp. 53-68, Aug. 1995.

M. A. Fullen, "Compaction, hydrological processes and soil erosion on loamy sands in east Shropshire, England," Soil Tillage Res., vol. 6, No. 1, pp. 17-29, Sep. 1985.

* cited by examiner

AUTONOMOUS SELF-ACTUATED TILLAGE IMPLEMENT

OBJECT OF THE INVENTION

The present invention relates to an autonomous self-actuated ploughing implement for the farm working of crops.

APPLICATION FIELD OF THE INVENTION

The autonomous self-actuated ploughing implement object of the invention is mainly applicable in agriculture works and, especially, in cultivation and breaking-up works.

BACKGROUND OF THE INVENTION

Today, different tillage implements, such as turning plows, chisels, disc plows, cultivators or subsoiling farm implements are used to till the land. These implements are attached behind a tractor that draws them, supplying the necessary power to lift and break up the soil, and perform other operations on the land.

These working means present several problems, the main one being that operations cannot be automated because the tractor must be driven and handled by a person. Moreover, the need to use a tractor increases investment costs, and tractor maintenance, including the necessary fuel consumption, is considerable.

Currently, these diesel-engine tractors do not represent an ideal solution from an ecological and environmental point of view, as they release large amounts of carbon dioxide into the atmosphere, use fossil fuel with limited resources, and their handling requires the ongoing attention of a driver or operator, which increases the final cost of the cultivated products.

Tractors achieve their adherence from the interaction of the tire with the land and as a result of the tractor's weight; this technique requires the use of water-filled tires, counterweights and heavy tractors. This has a compaction effect on farmlands with the consequent loss of fertility. Having to move the tractor's tonnage, which requires an energy consumption that is lost with the tire grip and which is not useful in moving the land, is an inefficiency.

An ideal solution to at least partially solve the problems of current tractors would be the development of tractors operated by solar energy or directly with electricity; however, developments made in these types of solar or electric power are not applicable to existing tractors, which are of large dimensions, weight and power, since it would be necessary to use a disproportionate number of photovoltaic panels to recharge the batteries and, in the case of electrical power, in addition to having a very restricted range, recharging the vehicle's battery would require the installation of power points in crop fields, which is impractical due to both the cost of the installation and the huge amount of time required to recharge the batteries.

U.S. Pat. No. 6,199,000 document describes a self-propelled tractor comprising a telematics central unit comprising a global positioning system (GPS), sensors for the reception of a number of input parameters, a camera for capturing images of the surroundings and a control unit associated to the GPS and to the input sensors which, based on the information provided by both, determines the farm work to be performed and exchanges this information with a data storage unit. Since this tractor has supporting wheels, it causes a compaction of the soil during its movement and the consequent loss of fertility; and fails to satisfactorily resolve the abovementioned problems regarding the consumption of energy used on just the displacement of the tractor.

Different implements intended to be attached to a tow tractor by different means are also known. For example, document GB 1174622 describes an attachment system for implements employed on a tractor to the structure thereof and highlights the importance that these tools can describe not only a vertical movement but also a lateral movement. This implement requires coupling to a tractor, so it does not resolve either the problems mentioned above concerning soil compaction caused by the tractor wheels, and the inevitable consumption of energy targeted exclusively at engine movement.

DESCRIPTION OF THE INVENTION

The autonomous self-actuated tillage implement that is the object of this invention has certain technical features designed to provide means for farm working using their own resources. It does this by achieving a grip on the ground which enables the tool to advance by itself, without using any tractor or additional element that supplies power to pull the implement, being mainly powered by solar energy, without ruling out the use of wind energy or internal or external combustion engines.

Another object of the invention is to equip the implement with guide means for its guiding and displacement without the physical presence of a driver, meaning the implement can be left unattended throughout the working day.

According to the invention, the farm implement comprises:
- at least one first plow share in a front position, provided with anti-rollback means, and, at least, a second plow share in a rear position, with other anti-rollback means, the plow shares being interconnected by alternating approaching and distancing means with arms,
- a telematic control unit based on a computer system assisted by a global positioning system (GPS) for the autonomous guiding and moving of the implement.
- a steering system that is formed by an oscillating support that can rotate in a plane perpendicular to the advancement direction of the implement, operationally suitable to lift one of the plow shares in relation to the ground and displace it laterally through the contact this support has on the ground.
- a power supply system connected to the control unit and to the approaching and distancing means to supply drive power, to be selected from photovoltaic panels, wind energy generators or an internal (such as diesel and otto cycle engines) or an external (stirling cycle engine) combustion engine mounted on the implement.

Thus, the approaching and distancing means can be of different nature, and moved by electric engines or directly in a mechanical way, such approaching and distancing means comprising devices such as a ball screw, a mechanism with a beam and a chain between two pinions, with the arm of a plow share being hooked at a point in the chain; or a scissor mechanism that expands and contracts by the action of one or more reversible engines, causing both plough shares to perform alternative forward movements.

The anti-rollback means are responsible for said direction of advance being one-way, providing in each movement an alternating fastening of the plow shares with one of the plow shares being static during the displacement of the other plow share.

The steering system enables the forward direction to be changed by lateral displacement of one of the plow shares, pivoting over the other plow share. The oscillating support is preferably arranged on the approaching and distancing means themselves, with its own drive motor, and is shaped so that in an inoperative position it remains lifted, without making contact with the ground, but in an operating position, descends and, when it makes contact with the ground, lifts one of the plow shares, preferably the front one, and moves it laterally.

Depending on the rotation direction of this oscillating support, one of the plow shares, preferably the front one, will be transferred to one side or another at a certain step or distance; by means of one or more transfers to the same side, the implement can be oriented in the desired direction, for example, to turn around when reaching the end of a plot.

The control unit allows the device to be fully automatic, allowing work to be limited to a specific piece of land by controlling the position using the global positioning system (GPS), so that it is easy to demarcate the plot or work area.

In one embodiment, the anti-rollback means consist of an crampon that swings with respect to a horizontal joint arranged at the plow share rear, so that when a plow share advances, the corresponding crampon slides along the ground, and when the other plow share advances, the said crampon sticks in the ground, thus preventing the rollback of the plow share, which remains static at that time.

The implement has removable plow shares, which are combinable and interchangeable with moldboards, cultivators, discs, chisels, cylinders, harrows or subsoilers, depending on the work to be carried out.

The power supply system comprises electric batteries that store electrical energy, allowing energy to be accumulated during downtime hours or providing support when the energy captured, for example by photovoltaic panels or wind energy generator, is insufficient to operate all the mechanisms. These batteries serve to stabilize the electrical power supply to different consumer devices of the tillage implement. These batteries combined with combustion engines make hybrid power mechanisms, as they are recharged by an electric generator and then they supply power with the corresponding electric engine.

In one embodiment, photovoltaic panels are mounted on the tillage implement using at least one steerable support or solar tracker. This support allows the aforementioned solar panels to be placed in an optimal position with respect to the sun, regardless of the direction in which the implement is moving with regard to the sun.

The plan is for the implement to have means for the transmission of information on the implement's operation, through a control unit.

Thus, the implement comprises at least one camera to capture images of the environment, with said camera connected to the control unit. This camera enables the control unit to capture and store work evolution and the place where the farm working has been done, and allows a subsequent inspection directly on the device, or even the real-time transfer of images, so that the implement can be controlled remotely in case of any operative incidents or if the farm work is being carried out improperly.

The implement also comprises sensors connected to the control unit and which are used to gather environmental parameters and/or parameters of the land to be worked. This makes it easy to detect whether the soil is too wet or hard to be worked, stopping the implement's operation until conditions are optimal.

DESCRIPTION OF FIGURES

To complement the description that is being carried out and to facilitate understanding of the characteristics of the invention, the present description is accompanied by a set of drawings wherein, for illustrative purposes only, the following has been represented.

PREFERRED EMBODIMENT OF THE INVENTION

Figure 1:
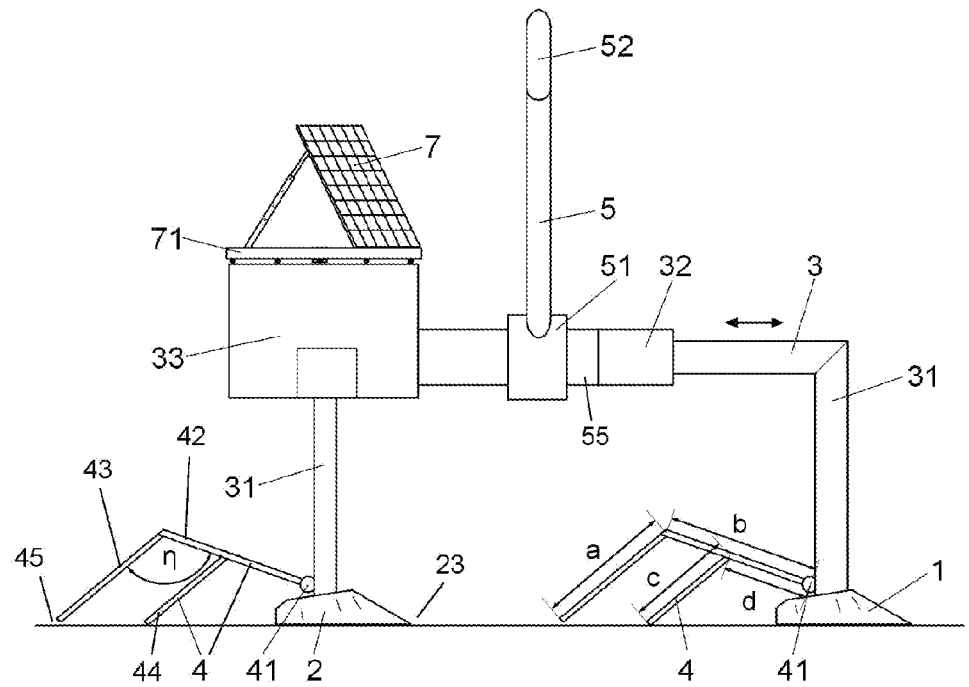
FIG. 1 shows a profile view of the implement.
Figure 2:
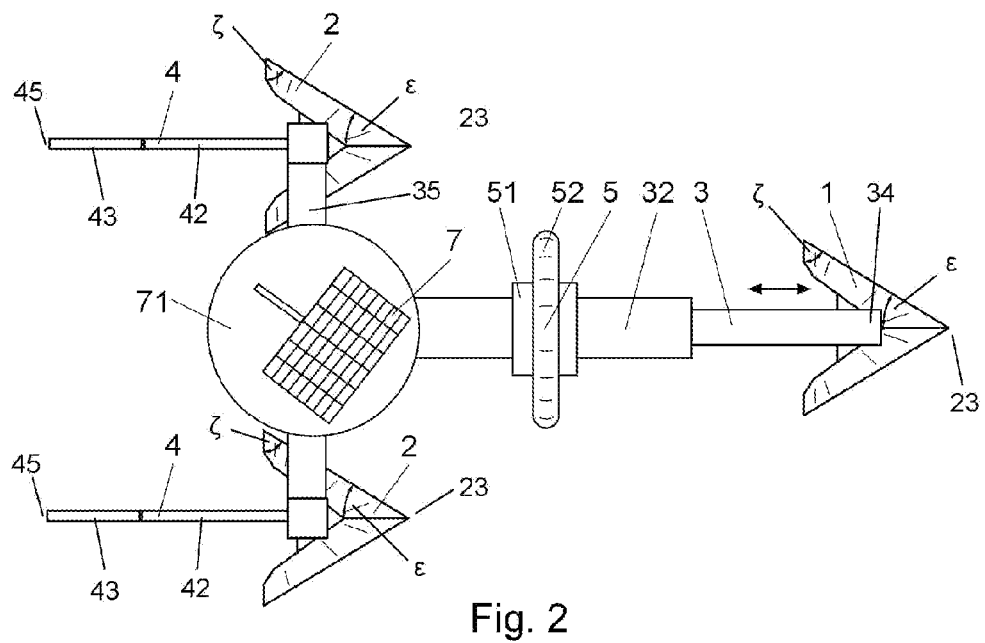
FIG. 2 shows a plan view of the implement.

As the figures show, the autonomous self-actuated tillage implement of the invention comprises a first plow share (1) in a front position, provided with anti-rollback means, and two second plow shares (2) in a rear position, with other anti-rollback means, the plow shares (1, 2) being interconnected by alternate approaching and distancing means (3) with arms (31), said alternate approaching and distancing means (3) being, in this case, a ball screw protected by an outer cover (32) and associated to an external drive motor (not shown) to provide the alternating movement which causes the implement to move forward. In this case the drive motor is a three-phase motor controlled by a frequency converter (not shown).

Figure 4:
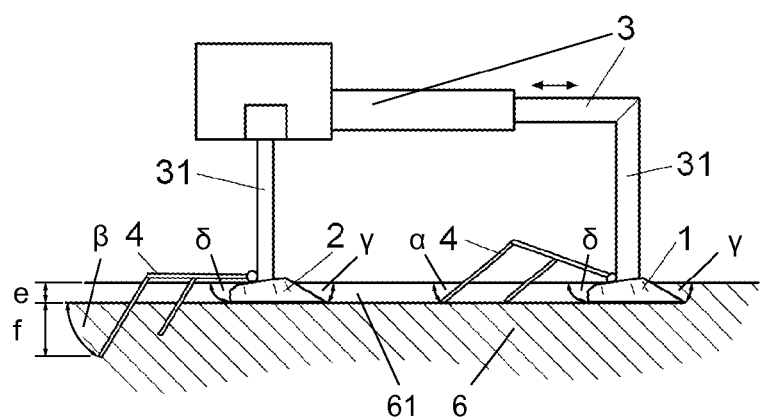
FIGS. 4 and 5 schematically show the two advance positions of the implement.
Figure 5:
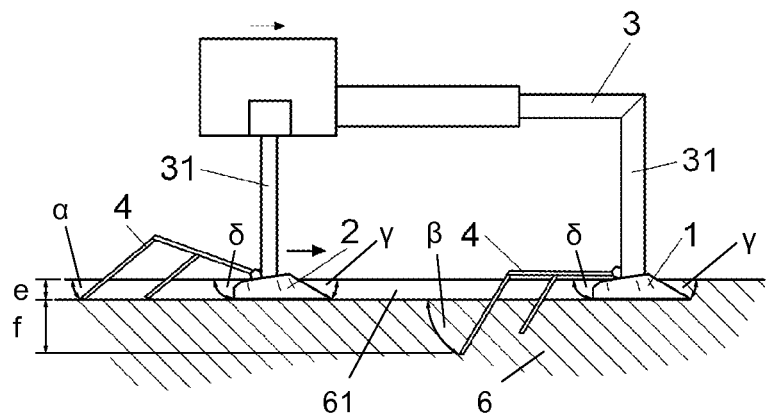

The anti-rollback means in each plow share (1, 2) are formed by a crampon (4) swinging around a horizontal joint (41) at the rear of the said plow shares (1, 2). As represented in FIGS. 4 and 5, these crampons (4) stick into the ground automatically at the start of the rearward displacement of the plow shares (1, 2) corresponding to each movement of the approaching and distancing means (3).

Figure 3:
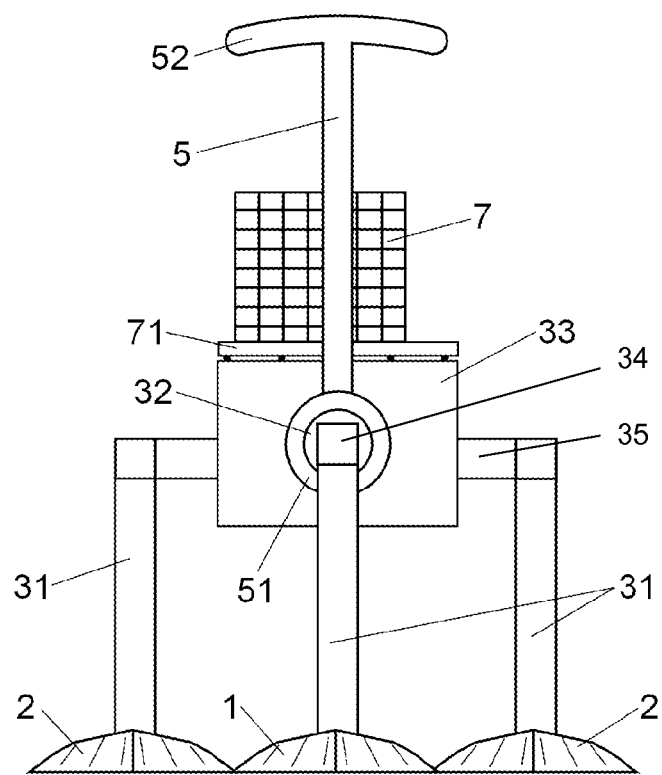
FIG. 3 shows a view of the implement from the front end.
Figure 6:
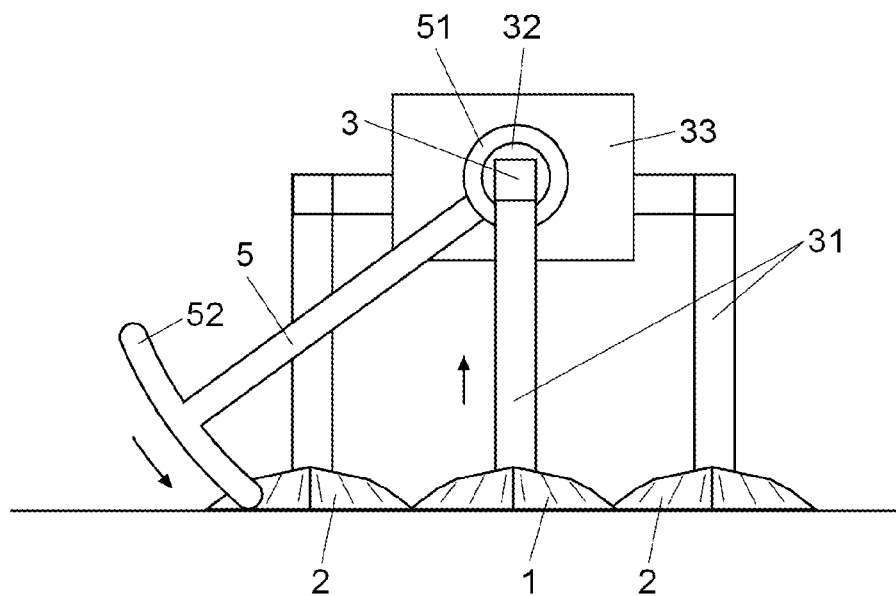
FIGS. 6 and 7 show a plan view from the front end of the implement in rotation operation through the oscillating support.
Figure 7:
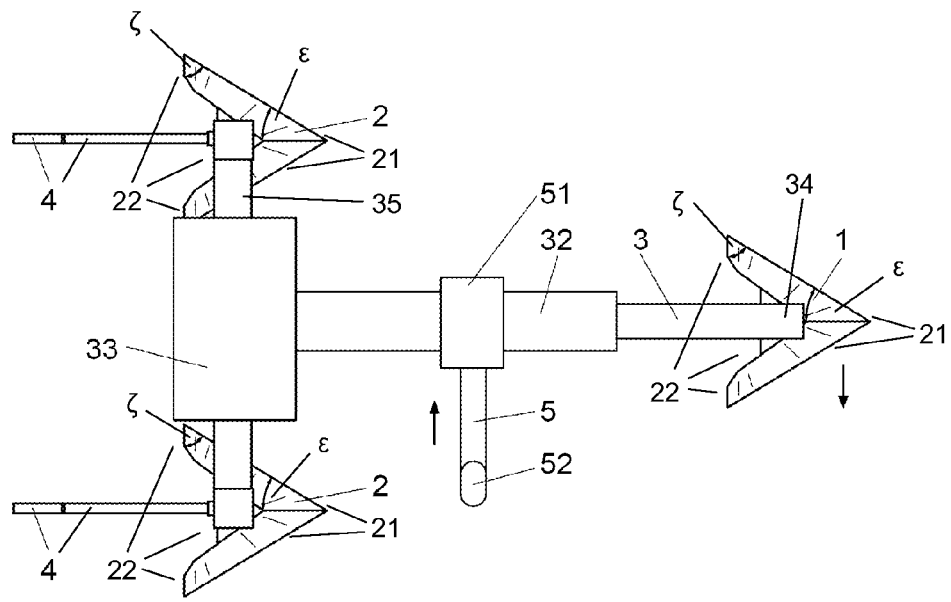
Figure 8:
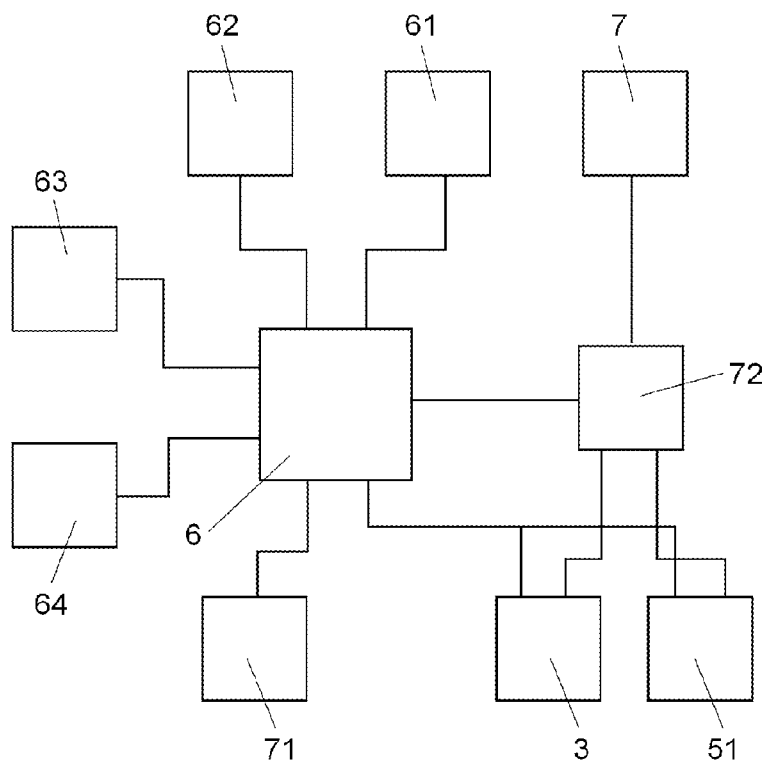
FIG. 8 shows a block diagram of the electrical and electronic circuit of the power supply system powered by solar energy and of the control unit of the implement.

The implement comprises a steering system which allows the direction of advance to be changed; this steering system being formed by an oscillating support (5) mounted on a motorized rotation mechanism (51) with a drive motor (55), coupled to the cover (32) of the approaching and distancing means (3), the end (52) of the oscillating support being in the form of an anchor, as represented in FIGS. 3 and 6. This oscillating support (5) is able to lift the front plow share (1) of the implement, as illustrated in FIGS. 6 and 7, as the end (52) of said oscillating support (5) can be arranged at a point lower than the lower end of said front plow share (1). So when this end (52) of the oscillating support (5) rests on the ground during rotation, the elevation and counterclockwise transfer of the said plow share (1) occurs.

The implement comprises a housing (33) at the top and behind the cover (32) wherein the motor and part of the ball screw of the approaching and distancing means (3) are housed. Within said housing (33) there is also the control unit that manages the operation of the entire implement. The control unit is based on a computer system (6), which is connected to a global positioning system (61) or GPS for guiding the implement.

The implement comprises a solar-energy powering system, comprising photovoltaic panels (7) arranged on the housing (33) by a steerable support (71). The solar-energy powering system further comprises electric batteries (72), in this case arranged within said housing (33).

The control unit has associate means for transmitting information (62), in this case a radio frequency transmitting equipment connected to the computer system (6).

The implement control unit also comprises a camera (63) to capture images of the surroundings and remotely transmit these, and sensors (64) that gauge environmental parameters and/or parameters of the land to be worked, such as temperature and humidity sensors.

Once the nature of the invention as well as an example of preferred embodiment have been sufficiently described, it is stated for all pertinent purposes that the materials, shape, size and arrangement of the elements described are susceptible to changes, provided these do not involve an alteration of the essential characteristics of the invention that are claimed subsequently.

The invention claimed is:

1. A self-actuated tillage apparatus, comprising:
a front implement frame (34) in a front position, and a rear implement frame (35) in a rear position;
wherein the front implement frame comprises at least one of a tillage implement (1) for tilling soil and an anti-rollback means (4);
wherein the rear implement frame comprises at least one of a tillage implement (2) for tilling soil and an anti-rollback means (4):
wherein when the front implement frame comprises at least one tillage implement, the rear implement frame comprises at least one anti-rollback means;
wherein when the rear implement frame comprises at least one tillage implement the front implement frame comprises at least one anti-rollback means;
wherein said anti-rollback means comprise at least one crampon (4);
wherein the at least one crampon (4) is attached to at least one of the front and rear implement frames (34,35) by a movable joint (41) which allows the crampon to pivot relative to said at least one of the front and rear implement frames, wherein the at least one crampon (4) is adapted to prevent backward motion of said at least one of the front and rear implement frames (34,35) it is attached to by sticking into an area of ground when said at least one of the front and rear implement frames (34,35) it is attached to is under backward pressure;
an approaching and distancing means (3) engaged to the front implement frame (34) and the rear implement frame (35), the approaching and distancing means being connected to a power supply system which supplies drive power and also to a control unit, the approaching and distancing means (3) being configured to alternately push the front and rear implement frames apart and pull them back towards each other during operation using drive power from the power supply system;
wherein the tillage apparatus is configured to, in operation, move forward by said alternate pushing and pulling by the approaching and distancing means, in combination with the action of the anti-rollback means (4) preventing backward motion while allowing forward motion.

2. A tillage apparatus according to claim 1, wherein at least one tillage implement (1,2) comprises a plow share.

3. A tillage apparatus according to claim 1, wherein at least one tillage implement (1,2) is fixed to at least one of the front and rear implement frames (34,35) and is removable and interchangeable with one or more other tillage implements.

4. A tillage apparatus according to claim 1, wherein the power supply system comprises electric batteries (72) that store electrical energy.

5. A tillage apparatus according to claim 1, wherein the power supply system comprises one or more photovoltaic panels (7) mounted on the tillage apparatus.

6. A tillage apparatus according to claim 1, comprising means for transmitting information (62) connected with the control unit.

7. A tillage apparatus according to claim 1, including at least one camera (63) adapted to capture images of an area surrounding the tillage apparatus, said camera (63) being connected to the control unit.

8. A tillage apparatus according to claim 1, including sensors (64), connected to the control unit, for gathering at least one of environmental parameters and parameters of the land to be worked.

9. A tillage apparatus according to claim 1,
wherein the control unit is linked to a global positioning system and is adapted to facilitate autonomous operation of the tillage apparatus.

10. A tillage apparatus according to claim 1, further comprising a steering system,
wherein the steering system comprises an oscillating support (5) and a drive motor that can rotate the oscillating support (5) in a plane perpendicular to the advancement direction of the implement,
wherein the steering system is adapted to lift one of the implement frames (34,35) in relation to the ground and displace the implement frame laterally by rotating the oscillating support towards one side of the tillage apparatus to contact an adjacent area of ground, and thereby lift and laterally move one of the implement frames (34,35).

11. A tillage apparatus according to claim 1, wherein the at least one crampon (4) comprises a plurality of tines.

12. A tillage apparatus according to claim 1, wherein the at least one crampon comprises:
a shaft (42) pivotally connected to the front implement frame (34) or the rear implement frame (35) by said movable joint (41), the shaft (42) being capable of pivoting to a generally horizontal orientation pointing backwards with respect to a forward motion direction of the tillage apparatus, and
a plurality of tines (43,44) projecting from the shaft (42), wherein the tines (43,44) are oriented so that when the shaft (42) is oriented horizontally pointing backwards, the tines (43,44) each project at an angle ($\eta$) intermediate between downwards and backwards with respect to the forward motion direction of the tillage apparatus.

13. A tillage apparatus according to claim 1, wherein the at least one crampon comprises:
a shaft (42) pivotally connected to the front implement frame (34) or the rear implement frame (35) by said movable joint (41), the shaft (42) being capable of pivoting to a generally horizontal orientation pointing backwards with respect to a forward motion direction of the tillage apparatus,
a longer tine (43) and a shorter tine (44) projecting from the shaft (42), the shorter tine (44) being connected to the shaft (44) forward of the longer tine (44);
wherein the tines (43,44) are oriented so that when the shaft (42) is oriented horizontally pointing backwards, the tines (43,44) each project at an angle ($\eta$) intermediate between downwards and backwards with respect to the forward motion direction of the tillage apparatus.

14. A tillage apparatus according to claim 1, wherein the at least one crampon comprises:
a shaft (42) pivotally connected to the front implement frame (34) or the rear implement frame (35) by said movable joint (41), the shaft (42) being capable of pivoting to a generally horizontal orientation pointing backwards with respect to a forward motion direction of the tillage apparatus, a plurality of tines (43,44) projecting from the shaft (42), wherein the tines (43,44) are oriented so that when the shaft (42) is oriented horizontally pointing backwards, the tines (43,44) each project at an angle ($\eta$) intermediate between downwards and backwards with respect to the forward motion direction of the tillage apparatus;

wherein the shaft (42) and the tines are all substantially within a common plane; and wherein one or more of the tines (43,44) consist of an elongated rectangular bar.

15. A tillage apparatus according to claim 1,
wherein the front implement frame (34) and the rear implement frame (35) each comprise at least one tillage implement and at least one crampon.

16. A tillage apparatus according to claim 1,
wherein at least one tillage implement (1,2) has a front end (21) and a back end, wherein the back end is wider than the front end, and wherein the back end of said tillage implement is a second anti-rollback means.

17. A tillage apparatus according to claim 1, wherein the approaching and distancing means (3) comprises a ball screw.

18. A self-actuated tillage apparatus, comprising:
a front implement frame (34) in a front position, the front implement frame comprising at least one front crampon (4);

wherein the at least one front crampon (4) is adapted to prevent backward motion of the front implement frame (34) by sticking into an area of ground when the front implement frame (34) is under backward pressure;

a rear implement frame (35) in a rear position, the rear implement frame comprising at least one rear crampon (4);

wherein the at least one rear crampon (4) is adapted to prevent backward motion of the rear implement frame (35) by sticking into an area of ground when the rear implement frame (35) is under backward pressure;

one or more tillage implements positioned for tilling soil as the tillage apparatus moves forward;

an approaching and distancing means (3) engaged to the front implement frame (34) and the rear implement frame (35), the approaching and distancing means being connected to a power supply system which supplies drive power and also to a control unit, the approaching and distancing means (3) being configured to alternately push the front and rear implement frames apart and pull them back towards each other during operation using drive power from the power supply system;

wherein, in operation, the tillage apparatus moves forward by said alternate pushing and pulling by the approaching and distancing means, in combination with the action of the front and rear crampons (4) preventing backward motion and allowing forward motion of the respective front (34) and rear (35) implement frames.

19. A tillage apparatus according to claim 18, wherein the approaching and distancing means (3) comprises a ball screw.

20. A tillage apparatus according to claim 18, wherein at least one crampon comprises:
a shaft (42) pivotally connected to the front implement frame (34) or the rear implement frame (35) by a movable joint (41), the shaft (42) being capable of pivoting to a generally horizontal orientation pointing backwards with respect to a forward motion direction of the tillage apparatus, a plurality of tines (43,44) projecting from the shaft (42), wherein the tines (43,44) are oriented so that when the shaft (42) is oriented horizontally pointing backwards, the tines (43,44) each project at an angle ($\eta$) both downwards and backwards with respect to the forward motion direction of the tillage apparatus.

* * * * *